B. HOLLY.

Water-Supply Regulator for Water-Works.

No. 5,132. Reissued Nov. 5, 1872.

Witnesses.
R. T. Campbell
E. N. Campbell

Inventor
Burdett Holly
by
Munn, Fenwick & Lawrence

THE NORRIS PETERS CO., PHOTO-LITHO., WASHINGTON, D. C.

UNITED STATES PATENT OFFICE.

BIRDSILL HOLLY, OF LOCKPORT, NEW YORK.

IMPROVEMENT IN WATER-SUPPLY REGULATORS FOR WATER-WORKS.

Specification forming part of Letters Patent No. 87,413, dated March 2, 1869; reissue No. 4,085, dated August 2, 1870; reissue No. 5,132, dated November 5, 1872.

*To all whom it may concern:*

Be it known that I, BIRDSILL HOLLY, of Lockport, in the county of Niagara and State of New York, have invented a new and Improved System of Water-Works for Supplying Cities and Towns with Water; and I do hereby declare that the following is a full, clear, and exact description thereof, reference being had to the accompanying drawing making part of this specification, in which—

Figure 1:
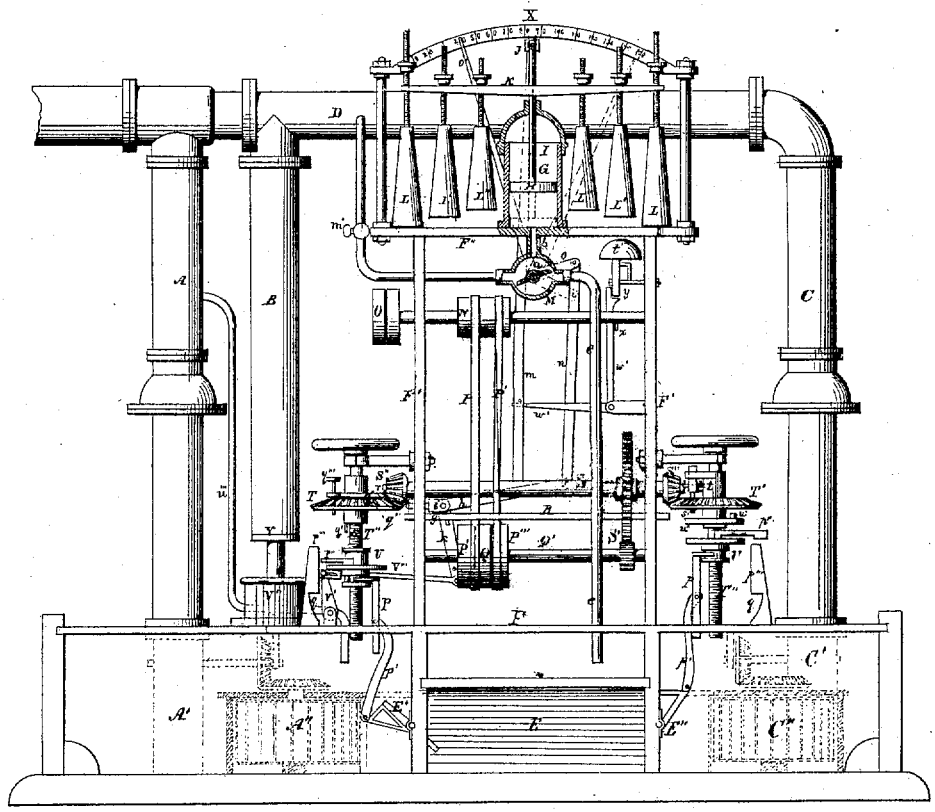
Figure 2:
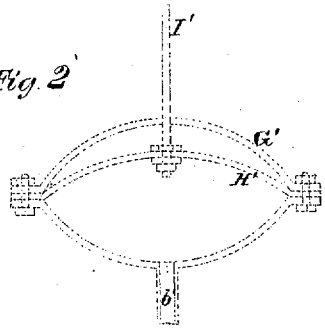
Figure 3:
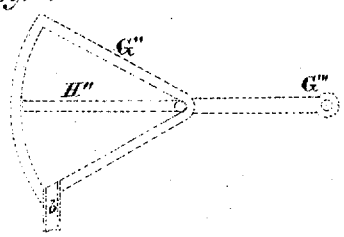

Figure 1 is a front elevation of my invention. Fig. 2 is a section of a modified piston-chamber. Fig. 3 shows another modification of the piston-chamber.

The object of my invention is not only to supply cities with water for ordinary purposes at any desired elevation without the use of a reservoir or stand-pipe, or any other contrivance which relies for its efficiency upon the principle of the hydrostatic equilibrium, but also, by the same instrumentalities, to furnish the means of extinguishing fires at any one point, or at several points at the same time, if necessary, and all this without the use of any movable engine for that purpose.

To accomplish this object I place one or more pumps, or their equivalents, at some convenient point where the supply of water is accessible, and from whence, by a proper system of pipes, the water can be conducted wherever it is needed. These pumps force the water directly into the mains, contrivances having first been provided by which the pressure in these mains may be increased or diminished, or kept uniform at any degree that may be needed in order to effect the purpose desired.

The pumping machinery must be adequate to the duty required, having a reserve of power sufficient for extraordinary occasions. The pump I prefer for this purpose is that patented by me February 6, 1855, to be driven by any suitable steam or water power; but I do not limit myself to this contrivance, as various other pumps may be used for this purpose.

I do not pretend to have been the first to conceive the idea of furnishing water in limited quantities for ordinary use by means of forcing-pumps; nor do I deny that stationary pumps have been employed instead of movable ones in throwing water for the extinguishment of fires; but my invention consists in effecting these two objects by one single apparatus, and then developing that apparatus into an effective system for the attainment of these ends. This is accomplished by pumping the water directly into the mains of the water-works, having made provision by which the degree of pressure therein may be entirely under the control of the operator, so that it may be preserved uniform, or increased or diminished in any degree at his pleasure. By this means the apparatus, which, with one degree of pressure, may be serving as a means of supplying water to a whole city for ordinary use, may, by simply increasing that pressure, become at the same time a most efficient fire-engine, which, through hydrants previously and properly located, may be made to operate in various portions of the city at the same time, and (owing to the great incompressibility of water) this change can be effected almost instantaneously throughout. This is the subject-matter of my invention.

Fig. 1 is a front elevation of the apparatus complete. A, B, and C are vertical pipes, and D is a horizontal pipe communicating with them freely. The pipes A and C receive the water from the rotary pumps A′ and C′, which are driven, respectively, by the turbines A″ and C″, shown in dotted lines. The pipe D leads to some main pipe, from which the street-mains branch off and ramify throughout the city. E is a sluice or water-way, having gates E′ E″, to admit water to the turbines which drive the pumps. As the gates are left more open or closed, so will the speed of the turbines and pumps be greater or less, and the quantity of water forced into the pipes will be increased or diminished, causing a corresponding pressure in those pipes.

The ordinary pressure for domestic purposes and other daily uses may be kept up by driving a sufficient number of pumps at a slow rate of speed. But should a fire break out, a higher pressure and a larger quantity of water will be required in the mains. These will result from the increased speed of the pumps or by setting additional pumps in operation.

The two uprights F′ F′, which stand upon the bed-plate F, support the cross-plate F″, upon which a piston-chamber, G, is supported. This chamber is provided with a piston, H, the rod I of which passes up through the top or dome of the chamber, as shown in the drawing. Above the dome the piston-rod bears two cross-heads, J and K. From the cross-head K a number of weights, L, L′, and L″, are placed upon the right hand, and an equal number upon the left, respectively, equal and equidistant from the piston-rod. These weights are arranged in pairs, so that as the piston rises the two which are equidistant from the piston-rod shall rise from the cross-plate at the same time. By this means they will be raised successively, so that any impulse upon the piston H will be expended in a succession of resistances. This piston will not, therefore, rise with any sudden jerk or jump. Instead of the weights L, L′, and L″, one or more chains may be employed upon each side of said piston-rod, which will cause a gradually-increasing weight to bear upon the cross-head K as that cross-head rises. The cross-head J is used for connecting the motions of the piston with the mechanism below it, in the manner which will now be explained.

M is a water-gage, having a radial valve, *a*, within a chamber, which connects with the chamber G below the piston by a pipe, *b*, and with either of the pipes A, B, C, or D by a pipe, *c*. It is further provided with a waste-water pipe, *e*. This gage-chamber is made circular, except in the portion through which the right-hand wing of the valve *a* is to move, and is so constructed in that portion by means of an inclined surface or other contrivance that the valve shall not entirely prevent the flow of water through the water-gage, but shall only lessen that flow when the right-hand wing of that valve is moved upward, and increase it when that wing is moved downward. The valve *a* works on an axis which is rigidly connected with the arm *o* and with the index *o*′. If that index, therefore, is moved to the left, the discharge through the pipe *e* will be lessened, and if it is moved to the right that discharge will be increased. The form of the chamber should be such that this increase or diminution will be gradual and as nearly uniform as possible. The other wing of the valve *a* is not intended to prevent the free ingress of water through the pipe *c* at any point of the range which is to be given to this index. If the pipe *e* were entirely closed, the pressure in the chamber G would be the same as that in the pipe D; but when an outlet is opened through the pipe *e*, the pressure in the chamber G will be lessened, and the more freely this outflow through *e* becomes the greater will be the difference between the pressure in the chamber G and that in the pipe D. By moving the index *o*′ to the right, therefore, this difference will be increased, so that if we would preserve the pressure in the chamber G the same as it was before that index was so moved, the pressure in the pipe D must be correspondingly increased. The contrary would be the case when that index was removed to the left.

By reference to subdivision B, numbered 4,086, of a previous reissue of the original patent, of which reissue the patent now surrendered for reissue was subdivision A, and which said first reissue was dated August 2, 1870, may be seen one method by which small differences of pressure in the chamber G may be compensated and corrected automatically; that matter need not, therefore, to be further considered now; but I shall proceed to explain how—partly through that very instrumentality—the degree of pressure in the pipe D may be increased or diminished in any degree that may be desired.

X is a scale, formed on the arc of a circle which is concentric with the pivot on which the index *o*′ turns. The degrees marked thereon indicate the number of pounds of pressure per square inch that will be needed in the pipe D in order to preserve stability of pressure in the piston-chamber G. This correspondence between the degrees upon this scale and the number of pounds of pressure upon the pipe D has been attained through careful experiment in relation to the shape of the water-gage M, the size of the pipes *c* and *e*, and the magnitude and position of the weights L L′ L″; but I have succeeded in the attainment of this object without difficulty.

Suppose that for ordinary purposes a pressure in the pipe D of forty pounds to the inch is desired; the index *o*′ should be fixed at the degree numbered 40 upon the scale, it being so constructed as not to be moved out of its place in any position by a jar or other slight cause. The self-adjusting process, which results from the contrivances which are the subject-matter of the patent embodied in subdivision B, hereinbefore referred to, would preserve the desired uniformity of pressure, and the machinery would operate harmoniously for days, and perhaps weeks or months, without any special supervision. But suppose a fire were to break out, and it should be desirable to increase the pressure in the mains to one hundred and fifty pounds to the square inch, the index *o*′ should be turned around to the figure 150 upon this scale. The valve *a* in the water-gage M, being so turned as to permit the water to flow more freely through the pipe *e*, would cause the pressure in the piston-chamber G to become less than before; the piston H would rapidly fall, and the machinery above referred to (which is described more particularly in subdivision B aforesaid) would be set in operation, and continued until the pressure in the mains was sufficient to raise the piston H to its normal position.

I will now proceed to show how this change of pressure may be effected by a person in a remote part of the city: Suppose that while the machinery is steadily working and causing a pressure in the mains of forty pounds to the square inch a fire were to break out in any portion of the city, some person having one of the keys distributed for that purpose should open one of the hydrants for a few seconds; and if two were opened at once the effect would be the more decided. The effect of thus opening a single hydrant to its fullest capacity would be to diminish the pressure in the mains to such a degree that the piston H would settle down, carrying with it the rods *m*, which are attached to the cross-head J. These, being pivoted to the arm *h*, would carry the rod *n*, which is pivoted to the same arm, and also to the arm *o*. This last-mentioned arm, being thus moved, would carry with it the index *o'*. A stop having been previously provided to limit the throw of this index, on an occurrence of this kind, the machinery described in subdivision B aforesaid will at once be set in operation, by which the motive power (whether water or steam) will be increased until the desired degree of fire-pressure shall be attained. After the fire is extinguished and the hydrants from which the water had been drawn shall be closed, the pressure in the mains will be suddenly increased to such a degree as to cause the piston H to rise sufficiently to throw the index *o'* back to its former position, where a stop previously fixed will arrest it, and the ordinary pressure in the mains will be soon restored.

It should be remembered that the hydrant which had been opened, as above stated, for the purpose of operating upon the index *o'*, is only intended to be kept open for a few seconds, or, at most, for a few minutes. A hose (which, for such purposes, should be kept in every small neighborhood throughout the city) should be at once attached to hydrant nearest the fire, and when this begins to play the hydrant first opened, as aforesaid, should be closed as gradually as possible.

In order to prevent every movement of the piston H from acting at once upon the index *o'*, I construct a slot in the upper end of the rod *n*, where it connects with the arm *o*. By this means all ordinary differences of pressure in the mains will be corrected without any change in the index *o'*.

I have shown how a person in a distant part of the city may bring a fire-pressure to bear upon the water-mains without the interposition, and even without the knowledge, of the attendant who is stationed at headquarters. As his co-operation is always desirable and sometimes necessary, I will now explain a contrivance by which he may be fully notified of the breaking out of a fire, and may take the necessary measures to aid in its extinction. What will be particularly needed of him will be to replenish the fire in the furnace in case steam-power is used for driving the pumps. On the upright arm of the crank-lever *w' w'* I support the stem *y* of a pivoted bell-clapper. When the hydrant is opened, as above described, and the piston H descends sufficiently, a stud on the rod *m* strikes the horizontal arm of the crank-lever, and trips the vertical arm from beneath the stem of the clapper, which thereupon drops down so as to be within reach of the stud *x* on the shaft of the drum N. Every revolution of that shaft will then cause the bell to ring and thus give the alarm.

A regular telegraphic fire-alarm that would give specific information not only of the existence of a fire, but of its exact locality and character, would be preferable to the contrivance above described; but in the absence of such a telegraph the above-described contrivance will answer a useful purpose.

To guard against the effect of sudden shocks, or "rams," where the flowing of water from a hydrant is suddenly checked, I use the well-known expedient of an air-chamber; and to prevent the danger of a continued pressure of too intense a degree, I have contrived a relief-valve, which has been made the subject-matter of subdivison C (No. 4,087) on a previous reissue of the original patent, of which this is in part a second reissue. A mere reference to that contrivance is all that is needed now. Instead of the cylinder G and piston H, as shown in Fig. 1, a flexible and elastic diaphragm, H', with its appurtenances, as shown in Fig. 2, or a rigid diaphragm, H'', working in the sector of a circle, as shown in Fig. 3, may be used. The methods of connecting such contrivances with the other portions of the machinery, as represented in Fig. 1, will be readily understood by the ordinary mechanic who is skilled in such matters.

In the patent now sought I do not intend to limit myself to the precise instrumentalities hereinbefore described, inasmuch as the principle of my invention may be embodied in many different forms. For instance, the mechanism by which the gates are operated may be modified in various ways, or different kinds of mechanism may be substituted therefor, such as a cock or conical screw-valve; or a slide or stop-valve may be used instead of the water-gage M and its valve *a*, and various other changes and substitutions may be adopted without the exercise of any inventive ingenuity. I prefer, however, the contrivances above shown for these different purposes, respectively.

What I claim as new, and desire to secure by Letters Patent, is—

1. The above-described method of supplying a city with water—that is to say, by pumping directly into the water-mains, when the apparatus for that purpose is supplied with contrivances by which the pressure within those mains may be preserved in a great degree uniform, sufficiently so for practical purposes, or increased or diminished at pleasure, substantially as and for the purpose above shown.

2. The water-gage M, when used in connection with a water-supply regulator, and so contrived that, while connected with one of the main pipes D, the pressure in such gage shall be kept less than that in the said pipe, and in some proportion to the size of a varying orifice into an exit-pipe, *e*, as and for the purpose above shown.

3. In such water-gage, so arranged and cooperating with the valve *a*, I claim the lever *o'*, by which the orifice into such exit-pipe may be regulated, while said lever shall also serve as an index, showing the degree of pressure in the main pipe D, which is necessary to produce a state of equilibrium in the water-gage as long as said index shall remain unchanged, substantially as described.

4. Connected with the gage M by the pipe *b*, I claim the cylinder G, with its piston H, for the purpose of communicating through the stem I to the other portions of the machinery motions which are regulated by the degree of pressure upon the under surface of such piston, substantially as and for the purpose described.

5. In combination with the cylinder G, with its piston H, carrying a stem, I, I claim the cross-head K, with its weights L L' L'', so constructed and arranged as to render the height of the piston H in its cylinder G proportional to the degree of pressure against its lower surface, substantially as and for the purpose described.

6. In their proper connection with a system of water-pipes and hydrants, I claim the combination of the water-gage M, piston H, and bell *t* with their respective appendages, when they are so constructed and arranged as to constitute a water-telegraph, giving notice at head-quarters of the breaking out of a fire, substantially as described.

7. In a system of water-works, I claim a combination of the water-gage M, piston H, and lever *o'* with their several appurtenances, when the whole is so contrived and arranged that a person at a distance from the actuating machinery of the system may operate almost instantaneously upon that machinery, so as to increase the pressure in the water-mains sufficiently for the purpose of extinguishing fires, substantially as above described.

BIRDSILL HOLLY.

Witnesses:
C. G. HILDRETH,
E. P. HOLLY.